(12) United States Patent
Kandasamy et al.

(10) Patent No.: US 10,581,638 B2
(45) Date of Patent: Mar. 3, 2020

(54) ASSIGN TUNNEL TAG IDENTIFYING VIRTUAL LOCAL AREA NETWORK TUNNEL

(71) Applicant: Hewlett Packard Enterprise Development LP, Houston, TX (US)

(72) Inventors: Mohanraj Kandasamy, Santa Clara, CA (US); Kumar Puta Swamy, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 94 days.

(21) Appl. No.: 15/956,281

(22) Filed: Apr. 18, 2018

(65) Prior Publication Data

US 2019/0327113 A1   Oct. 24, 2019

(51) Int. Cl.
| | |
|---|---|
| H04L 12/46 | (2006.01) |
| H04L 29/12 | (2006.01) |
| H04W 76/18 | (2018.01) |
| H04W 48/16 | (2009.01) |
| H04W 88/08 | (2009.01) |

(Continued)

(52) U.S. Cl.
CPC ...... *H04L 12/4645* (2013.01); *H04L 12/4633* (2013.01); *H04L 61/103* (2013.01); *H04L 61/2015* (2013.01); *H04W 48/16* (2013.01); *H04W 76/18* (2018.02); *H04W 12/04* (2013.01); *H04W 84/12* (2013.01); *H04W 88/08* (2013.01)

(58) Field of Classification Search
CPC ............. H04L 12/4645; H04L 12/4633; H04L 61/103; H04L 61/2015; H04W 48/16; H04W 76/18; H04W 88/08; H04W 12/04; H04W 84/12

See application file for complete search history.

(56) References Cited

U.S. PATENT DOCUMENTS

| | | |
|---|---|---|
| 7,647,422 B2 | 1/2010 | Singh et al. |
| 7,852,748 B2 | 12/2010 | Le Faucheur et al. |
| 7,961,599 B2 | 6/2011 | Proulx |
| 8,400,910 B1 | 3/2013 | Busch et al. |

(Continued)

FOREIGN PATENT DOCUMENTS

WO   WO-2016188110   12/2016

OTHER PUBLICATIONS

Owokade, A., Using VPN Tunnels as Backup Links: Primary and Backup VPN Tunnels on Cisco Asa (w/ Gns3 Lab), (Web Page), Feb. 17, 2015, 8 Pgs.

*Primary Examiner* — Rina C Pancholi (74) *Attorney, Agent, or Firm* — Brooks, Cameron & Huebsch, PLLC (57) ABSTRACT

An access point, comprising: a processing resource; and a memory resource storing machine-readable instructions to cause the processing resource to: assign a first tunnel tag to a first DHCP profile of a client device, the first tunnel tag identifying a primary VLAN tunnel to a first network controller of a first data center; assign a second tunnel tag to a second DHCP profile of the client device, the second tunnel tag identifying a secondary VLAN tunnel to a second network controller of a second data center; determine whether the primary VLAN tunnel to the first network controller is inactive based on a number of detected access failures; and connect the client device to the secondary VLAN tunnel in response to determining that the primary VLAN tunnel is inactive.

17 Claims, 4 Drawing Sheets

(51) Int. Cl.
*H04W 12/04* (2009.01)
*H04W 84/12* (2009.01)

(56) References Cited

U.S. PATENT DOCUMENTS

| | | | |
|---|---|---|---|
| 8,787,150 B2 | 7/2014 | Fiorone et al. | |
| 2003/0088698 A1* | 5/2003 | Singh | H04L 12/4641 |
| | | | 709/239 |
| 2006/0268767 A1* | 11/2006 | Sato | H04W 28/20 |
| | | | 370/328 |
| 2007/0008982 A1* | 1/2007 | Voit | H04L 12/462 |
| | | | 370/401 |
| 2013/0103836 A1* | 4/2013 | Baniqued | H04L 41/0803 |
| | | | 709/226 |

\* cited by examiner

ASSIGN TUNNEL TAG IDENTIFYING VIRTUAL LOCAL AREA NETWORK TUNNEL

BACKGROUND

In some networks, access points (APs) or routers may provide network connectivity to client devices. The client devices may be laptops, personal computers, smartphones, etc. A network may provide connectivity to offices, residences, university campuses, etc.

DETAILED DESCRIPTION

In a communications network, access points (APs) can provide network connectivity to client devices connected to the APs. For example, several personal computers, laptops, etc. may be connected to an AP for internet access. In some implementations, the AP may be a part of a virtual local area network (VLAN) enabled on a network controller situated in a data center. A VLAN may refer to a logical subnetwork that can group together a collection of devices that are a part of different physical local area networks (LANs). Many enterprise networks can set up VLANs to re-partition their network for improved traffic management, for example by providing employees from different physical offices with a first level of authorized access via a first VLAN while providing managers from different physical offices with a second level of authorized access to the network via a second VLAN. A client device connected to the AP may be able to access a virtual private network (VPN) formed by the VLAN. For example, the VPN may belong to a particular enterprise and the client device may be an employee remotely connecting to the VPN from the employee's home. As another example, the VPN may belong to a university and the client device may belong to a student. In some implementations, the client device may be wirelessly connected to the AP using a pre-shared key (PSK) based service set identifier (SSID). Additionally, the AP may be connected to a network controller in a data center via a wide area network that includes switches, routers, etc., in order to be a part of the VLAN enabled on the network controller.

In some examples consistent with the disclosure, an AP may be able to establish a connection with a backup network controller situated in a second data center when the AP's connection with a primary network controller in a first data center becomes inactive. In this way, a VPN connection being utilized by a client device connected to the AP can continue uninterrupted. The AP may be able to toggle or switch from a first VLAN tunnel terminating at a first network controller to a second VLAN tunnel terminating at a second network controller by assigning corresponding first and second tunnel tags to the dynamic host configuration protocol (DHCP) profiles of the client device. A tunnel allows for the transmission of data intended for use only within a private, usually corporate network through a public network in such a way that the routing nodes in the public network are unaware that the transmission is part of the private network. The AP may determine whether the first VLAN tunnel is active or inactive. If the first VLAN tunnel is inactive, the AP may provide the client device with a DHCP profile having a tunnel tag corresponding to a second VLAN tunnel and the AP may connect the client device to the second VLAN tunnel that provides access to a second network controller.

In a number of examples, the determination that the first VLAN tunnel is inactive may be made after the connection between the AP and the first network controller experiences a threshold number of failures. For example, the AP may determine that the first VLAN tunnel is inactive when the AP detects three failures in the first VLAN tunnel. In such a scenario, the AP may connect to a second VLAN tunnel leading to a second network controller of a second data center in order to maintain the VPN connection being utilized by the client device. In this way, the VPN connection used by the client device is redundant. In a number of examples, such VPN redundancy is provided for client devices that are wirelessly connected to the AP using a PSK based Service Set Identifier (SSID). Providing VPN redundancy in this manner may improve employee productivity and reduce other inefficiencies such as customer service delays that may occur when there is VPN downtime. In a number of examples, during the switch from one VLAN tunnel to another, the AP may terminate broadcasting of a SSID to the client device for a predetermined time period to cause the client device to be disconnected from the primary VLAN tunnel. In still other examples, connecting to a backup VLAN tunnel may be carried out by one of the AP, a switch that connects the AP to network controllers of data centers, network controllers situated in data centers, other APs, the client device, or a system formed by some combination of these devices.

As used herein, access point (AP), can, for example, refer to a networking hardware device that allows a client device to connect to a wired or wireless network. An AP can include a processing resource, a memory, and input/output interfaces, including wired network interfaces such as IEEE 802.3 Ethernet interfaces, as well as wireless network interfaces such as IEEE 802.11 WLAN interfaces, although examples of the disclosure are not limited to such interfaces. An AP can include memory, including read-write memory, and a hierarchy of persistent memory such as ROM, EPROM, and Flash memory. The processing resource of the AP may be a central processing unit (CPU), microprocessor, and/or other hardware device suitable for retrieval and execution of instructions stored in the memory of the AP, as further described below. In some implementations, AP may refer to a branch router, branch network controller, or any other networking device capable of forming a VPN tunnel to a network controller at a data center that is acting as a VPN concentrator. Further, AP can generally refer to receiving points for any known or convenient wireless access technology which may later become known. Specifically, the term AP is not intended to be limited to IEEE 802.11-based APs. APs generally may function as electronic devices that are adapted to allow wireless communication devices to connect to a wired network via various communication standards.

As used herein, a client device can, for example, refer to a device including a processor, memory, and input/output interfaces for wired and/or wireless communication. A client device may include a laptop computer, a desktop computer, a mobile device, an IoT device, and/or other wireless devices, although examples are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

As used herein, network controllers can, for example refer to a device including a processor, memory, and input/output interfaces for wired and/or wireless communication with a number of access points to manage the access points. The network controller is used by the network administrator to manage access points in large quantities in some implementations.

Figure 1:
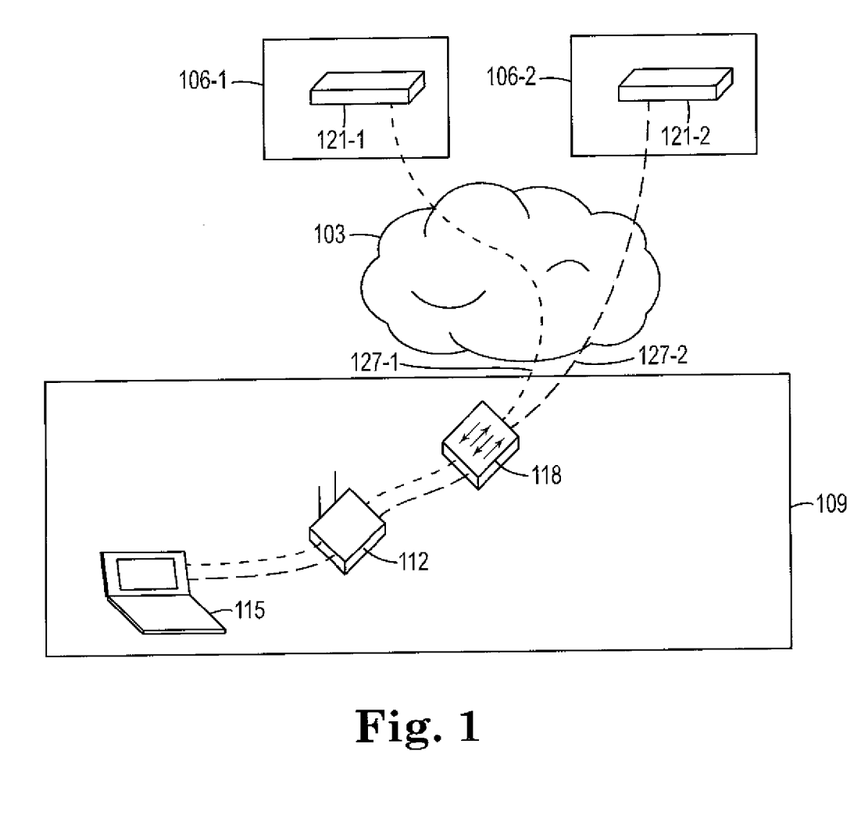
FIG. 1 illustrates an example environment consistent with the disclosure.

FIG. 1 illustrates an example environment consistent with the disclosure. As shown, a wide area network 103 includes a first data center 106-1 and a second data center 106-2, both in communication with a remote branch 109 of the wide area network 103. The remote branch 109 includes an AP 112 and a client device 115, such as a laptop, that is in communication with the AP 112, for example by a wireless connection. The remote branch 109 further includes a switch 118 that is situated between the AP 112 and the rest of the wide area network 103.

As further shown, the first data center 106-1 includes a first network controller 121-1 and the second data center 106-2 includes a second network controller 121-2. The first network controller 121-1 can manage a first set of APs including AP 112. Additionally, or alternatively, the second network controller 121-2 can manage a different set of APs including the AP 112. The second network controller 121-2 may serve as a backup controller for AP 112. The AP 112 can be a part of a first VLAN managed by the first network controller 121-1 of the first data center 106-1. Additionally, or alternatively, the AP 112 can be a part of a second VLAN managed by the second network controller 121-2 of the second data center 106-2. In this way, the AP 112 can facilitate VPN access by the client device 115, which may be a laptop being used by an employee connecting remotely via VPN, for example. The AP 112 may be connected to the first network controller 121-1 of the first data center 106-1 via a primary VLAN tunnel 127-1 or the AP 112 may be connected to the second network controller 121-2 of the second data center 106-2 via a secondary VLAN tunnel 127-2. The AP 112 of FIG. 1 may be an AP that is configured for distributed management. Specifically, the AP 112 may include a DHCP server able to provide an IP address to the client device 115. Additionally, the AP 112 may serve as a gateway to the wide area network 103 for the client device 115. In this way, the AP 112 may be configured for distributed management. Distributed management may refer to the DCHP server being integral with the AP 112 rather than being a part of the data centers 106-1 and 106-2.

Figure 2:
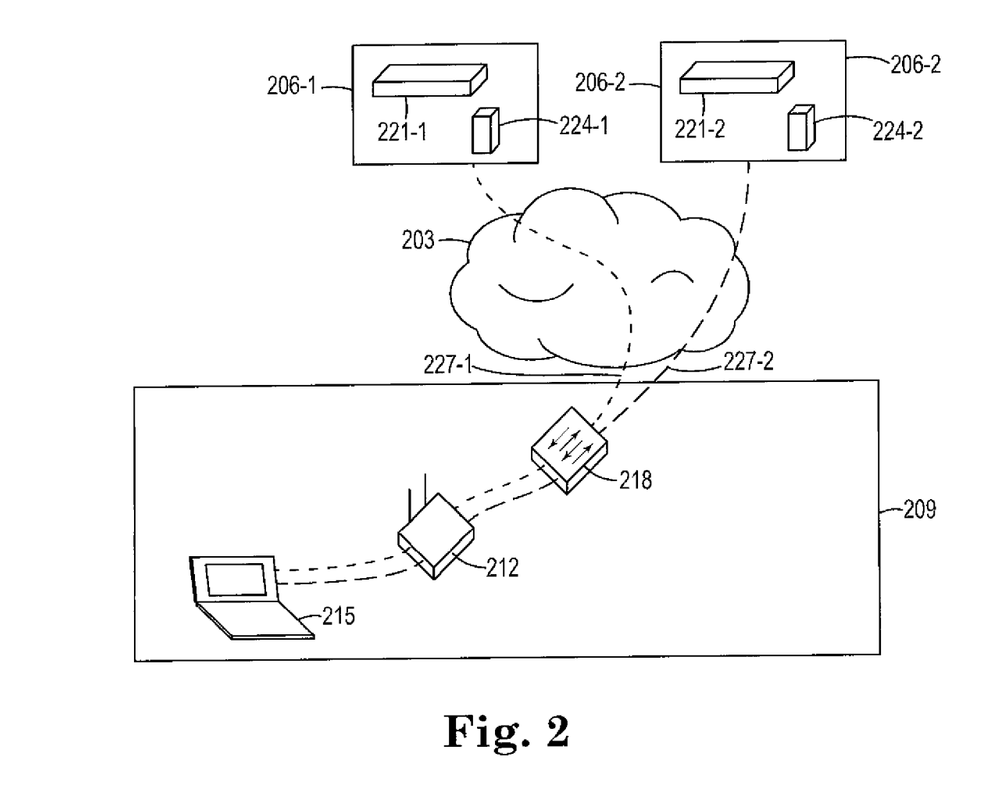
FIG. 2 illustrates another example environment consistent with the disclosure.

FIG. 2 illustrates another example environment consistent with the disclosure. As shown, a wide area network 203 includes a first data center 206-1 and a second data center 206-2, both in communication with a remote branch 209 of the wide area network 203. The remote branch 209 includes an AP 212 and a client device 215, such as a laptop, that is in communication with the AP 212, for example, by a wireless connection. The remote branch 209 further includes a switch 218 that is situated between the AP 212 and the rest of the wide area network 203.

As further shown, the first data center 206-1 includes a first network controller 221-1 and a first DHCP server 224-1 in communication with the first network controller 221-1. The second data center 206-2 includes a second network controller 221-2 and a second DHCP server 224-2 in communication with the second network controller 221-2. The first network controller 221-1 can manage a plurality of APs including the AP 212. Additionally, or alternatively, the second network controller 221-2 can manage a plurality of APs including the AP 212. The AP 212 can be a part of a first VLAN managed by the first network controller 221-1 of the first data center 206-1 or the AP 212 can be a part of a second VLAN managed by the second network controller 221-2 of the second data center 206-2. In this way, the AP 212 can facilitate VPN access by the client device 215, which may be a laptop being used by an employee connecting remotely via a VPN, for example. The AP 212 may be connected to the first network controller 221-1 of the first data center 206-1 via a primary VLAN tunnel 227-1 or the AP 212 may be connected to the second network controller 221-2 of the second data center 206-2 via a secondary VLAN tunnel 227-2. The AP 212 of FIG. 2 may be an AP that is configured for centralized management by the first network controller 221-1 or the second network controller 221-2. Specifically, the DHCP server 224-1 or the DHCP server 224-2 may be able to provide an IP address to the client device 215. Additionally, the first network controller 221-1 or the second network controller 221-2 may serve as a gateway to the wide area network 203 for the client device 215. In this way, the AP 212 may be configured for centralized management. Centralized management may refer to the DHCP servers 224-1 and 224-2 being a part of the data centers 206-1 and 206-2, respectively, rather than the DHCP servers 224-1 and 224-2 being integral with the AP 212.

Figure 3:
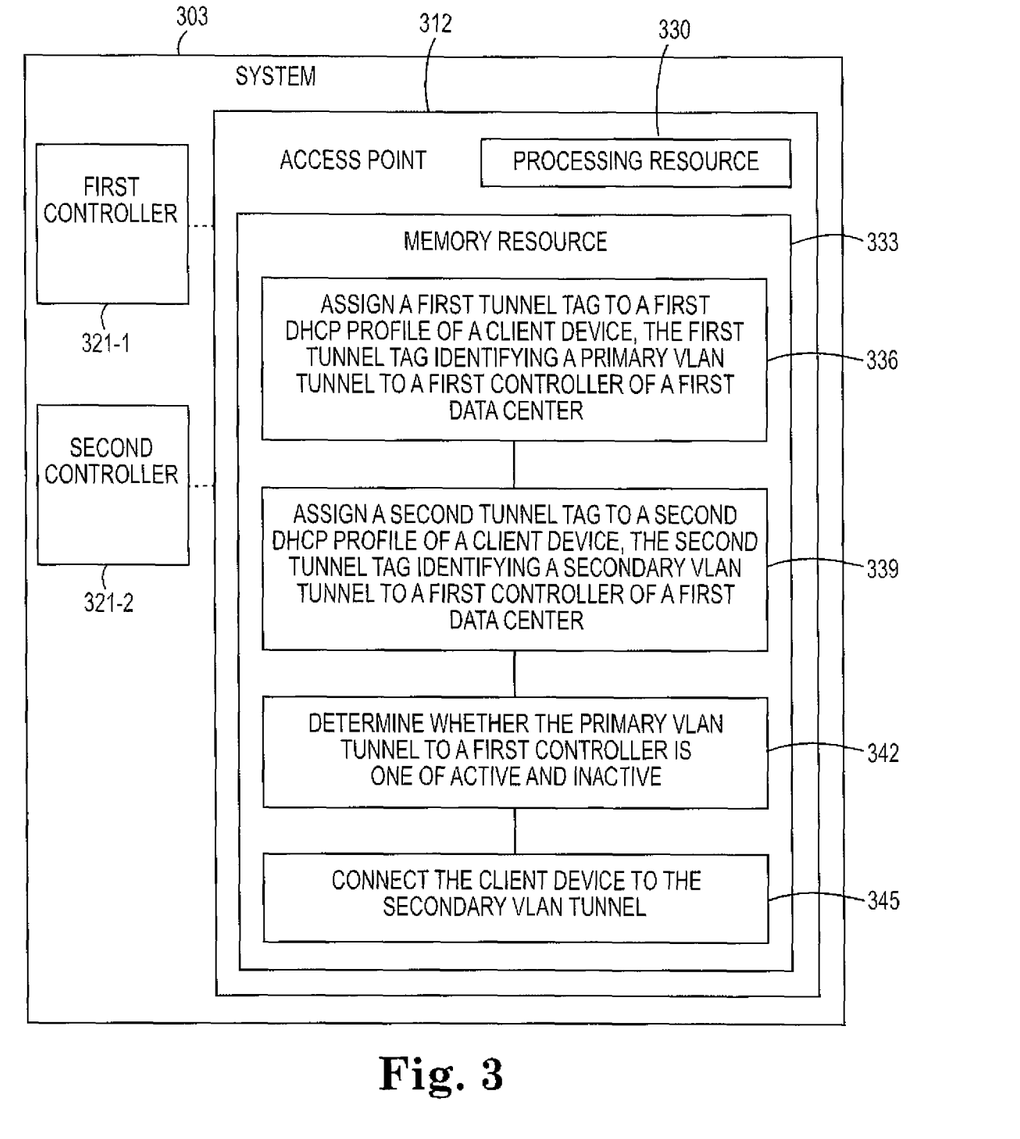
FIG. 3 illustrates an example system consistent with the disclosure.

FIG. 3 illustrates an example system (e.g., a wide area network or network) 303 for connecting to one of a primary VLAN tunnel and a secondary VLAN tunnel consistent with the disclosure. The system 303 may include an AP 312, a first network controller 321-1 in communication with the access point 312, and a second network controller 321-2 in communication with the access point 312. The AP 312 may include a processing resource 330 and a memory resource 333. The memory resource 333 of the AP 312 may store machine-readable instructions to cause the processing resource 330 to perform some or all of 336 to 345 of FIG. 3. In a number of examples, one of or some combination of the AP 312, the first network controller 321-1, and the second network controller 321-2 may include a memory resource that stores machine-readable instructions to cause a processing resource to perform some or all of 336 to 345 of FIG. 3. In other words, the system 303 may perform some or all of 336 to 345 of FIG. 3. In a default state, the AP 312 may be connected to a first VLAN via a primary VLAN tunnel that terminates at the first network controller 321-1. The first network controller 321-1 may be a part of a data center that hosts a VPN. The AP 312 may provide VPN access to a client device by connecting to the primary VLAN tunnel of the first network controller 321-1. The client device may be wirelessly connected to the AP 312 using a PSK based SSID.

At 336, the AP 312 may assign a first tunnel tag to a first DHCP profile of a client device, the first tunnel tag identifying a primary VLAN tunnel to the first network controller 321-1 of a first data center. In some examples, the AP 312 may include a DHCP server that provides a DHCP profile of the client device as in a network that is managed in a distributed manner (e.g., as in FIG. 1). In a number of examples, the first network controller 321-1 of the first data center may include a DHCP server that provides a DHCP profile of the client device as in a network that is managed in a centralized manner (e.g., as in FIG. 2). In such an example, the first network controller 321-1 may assign a first tunnel tag to a first DHCP profile of a client device, the first tunnel tag identifying a primary VLAN tunnel to the first network controller 321-1 of a first data center.

At 339, the AP 312 may assign a second tunnel tag to a second DHCP profile of the client device, the second tunnel tag identifying a secondary VLAN tunnel to a second network controller 321-2 of a second data center. The second tunnel tag is different from the first tunnel tag in that the second tunnel tag identifies a different VLAN tunnel. Each DHCP profile identifies a unique client device. A particular client device may have two DHCP profiles that identify the particular client device, where one DHCP profile includes a tunnel tag corresponding to a first VLAN tunnel and the second DHCP profile includes a tunnel tag corresponding to a second VLAN tunnel. Alternatively, the AP may assign multiple VLAN tunnel tags to the same DHCP profile of the same client, each tunnel tag corresponding to a different VLAN tunnel terminating at different network controllers that may be located in different data centers. In some implementations, the AP 312 may include a DHCP server that provides a DHCP profile of the client device, as in a network that is managed in a distributed manner. In a number of examples, the second network controller 321-2 of the first data center may include a DHCP server that provides a DHCP profile of the client device, as in a network that is managed in a centralized manner. In such an example, the second network controller 321-2 may assign a second tunnel tag to a second DHCP profile of the client device, the second tunnel tag identifying a secondary VLAN tunnel to the second network controller 321-2 of a second data center.

At 342, the AP 312 may determine whether the primary VLAN tunnel to the first network controller is inactive. Determining that the primary VLAN tunnel is inactive may be based on a number of detected access failures to ensure a true failure in service. For example, the AP 312 may detect three failures to access the first network controller 321-1 via the primary VLAN tunnel and determine that the primary VLAN tunnel is inactive based on detecting the three failures. The primary VLAN tunnel may be inactive because of a flaw in the connections between the first network controller 321-1 and the AP 312, for example. As another example, the primary VLAN tunnel may be inactive because of the first network controller 321-1 experiencing a power outage or downtime caused by a hardware failure. If the primary VLAN tunnel is inactive, the AP 312 may terminate broadcasting of a SSID to the client device for a predetermined period to cause the client device to be disconnected from the primary VLAN tunnel.

At 345, the AP 312 may connect the client device to the secondary VLAN tunnel in response to determining that the primary VLAN tunnel is inactive. This allows the AP 312 to maintain VPN service for the client device even when the primary VLAN tunnel fails.

In a number of examples, the AP 312 may be configured to provide access to a VLAN that is managed in a distributed manner. Additionally, the VLAN enabled on the AP 312 may be implemented on layer 3. In such an example, the AP 312, when connecting the client device to the secondary VLAN tunnel, may engage in a bid process with the second network controller 321-2 of the second data center and may obtain a subnet from the second network controller 321-2. The bid process may include determining the subnet used in the branch of the layer 3 network that includes the AP 312. The bid process may further include avoiding IP address or subnet overlap/conflict. Additionally, the bid process may further include ensuring that a branch is allocated the same subnet regardless of which AP out of an AP cluster in the branch of the network becomes the master AP. Additionally, the AP 312 may broadcast the SSID to the client device when connecting the client device to the secondary VLAN tunnel. Further, the AP 312, when connecting the client device to the secondary VLAN tunnel, may receive a DHCP request from the client device and may provide a DHCP acknowledgement to the client device. The DHCP acknowledgement provided to the client device may include a DHCP profile that includes a second tunnel tag identifying the secondary VLAN tunnel that is currently active. Additionally, the AP 312, when connecting the client device to the secondary VLAN tunnel, may receive an ARP request from the client device and may provide an IP address assigned in the subnet managed by the second network controller 321-2 through the secondary VLAN tunnel in response to the ARP request.

Alternatively, the AP 312 may be configured to provide access to a VLAN that is managed in a centralized manner. In such an example, the AP 312 may broadcast the SSID to the client device when connecting the client device to the secondary VLAN tunnel. Further, the AP 312, when connecting the client device to the secondary VLAN tunnel, may receive a DHCP request from the client device and forward the DHCP request to the second network controller 321-2, specifically to a DHCP server of the second network controller 321-2. Additionally, the AP 312, when connecting the client device to the secondary tunnel, may receive a DHCP acknowledgment from the second network controller 321-2 and provide the DHCP acknowledgement to the client device. The DHCP acknowledgement provided to the client device may include a DHCP profile that includes a second tunnel tag identifying the secondary VLAN tunnel that is currently active. Additionally, the AP 312, when connecting the client device to the secondary VLAN tunnel, may receive an address resolution protocol (ARP) request from the client device and may provide an 1P address belonging to the secondary VLAN tunnel in response to the ARP request. In this manner, the client device, the AP 312, the first network controller 321-1 and the second network controller 321-2 communicate with one another so that the AP 312 can toggle or switch from a primary VLAN tunnel terminating at the first network controller 321-1 to a secondary VLAN tunnel terminating at the second network controller 321-2. It should be noted that 336 to 345 described above may be performed in any appropriate order.

Figure 4:
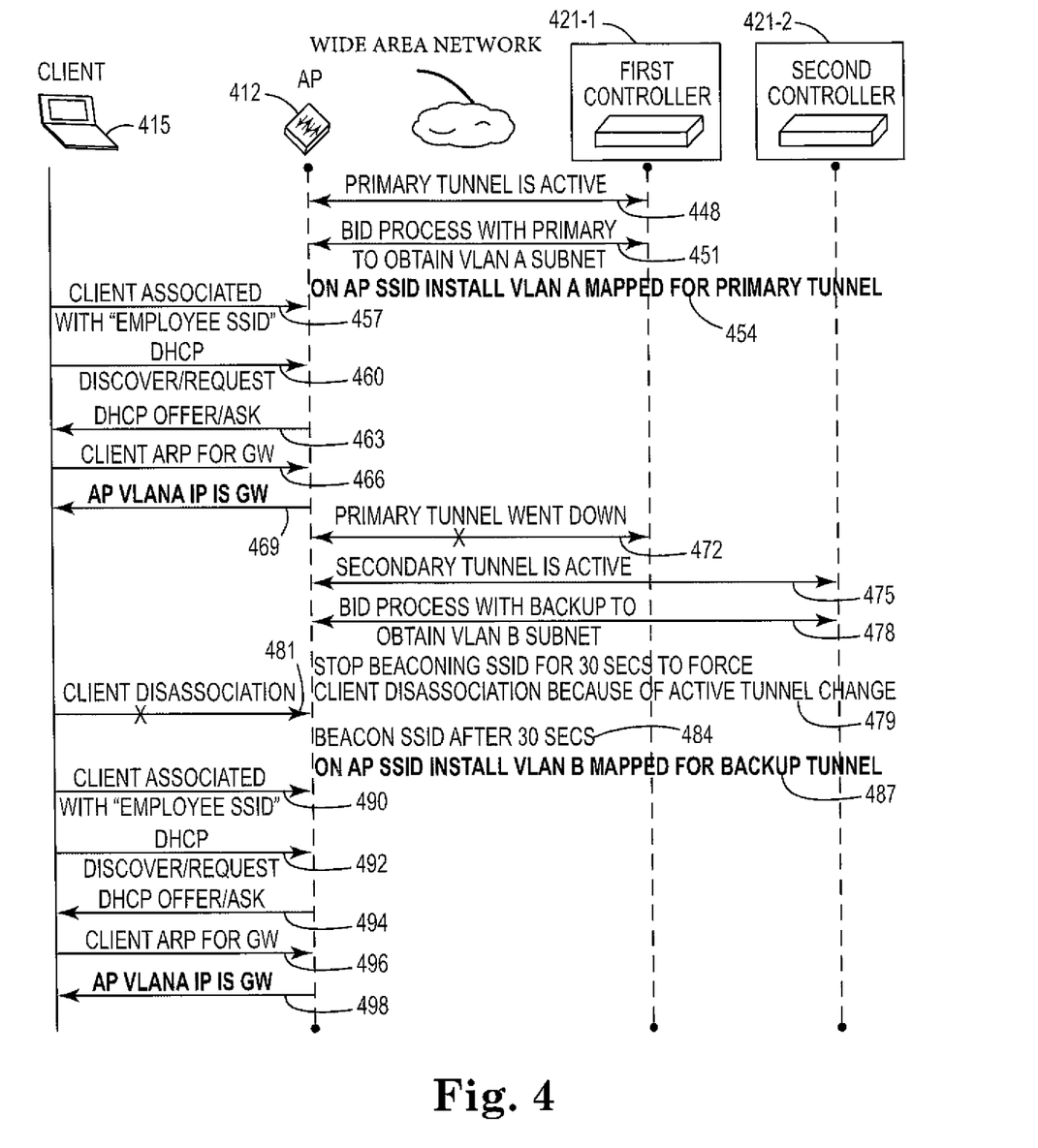
FIG. 4 illustrates an example message flow diagram consistent with the disclosure.

FIG. 4 illustrates an example message flow diagram consistent with the disclosure. FIG. 4 shows an AP 412 in communication with a first network controller 421-1, a second network controller 421-2, and a client device 415. The first network controller 421-1 may be a default network controller that the AP 412 is connected to in order to provide VPN access to the client device 415. As shown at 448, a primary VLAN tunnel between the AP 412 and the first network controller 421-1 is active. The second network controller 421-2 may be a backup network controller to provide VPN redundancy to the client device 415 when a primary VLAN tunnel to the first network controller 421-1 experiences downtime.

At 451, the AP 412, when connecting the client device to the primary VLAN tunnel, may engage in a bid process with the first network controller 421-1 of a first data center and may obtain a subnet from the first network controller 421-1, as shown at 454. At 457, the AP 412 may associate the client device 415 to an SSID that corresponds to the client device 415, such as an SSID assigned for employees. At 460, the AP 412 may receive a DHCP request from the client device 415 and may provide a DHCP acknowledgement to the client device 415, as shown at 463. At 466, the AP 412 may receive an ARP request from the client device 415 and may provide an IP address belonging to the primary VLAN tunnel in response to the ARP request, as shown at 469.

In some implementations, the primary VLAN tunnel to the first network controller 421-1 may experience downtime, as shown at 472. The AP 412 may determine that that the primary VLAN tunnel to the first network controller 421-1 is inactive. As shown at 475, the AP 412 may determine that a secondary VLAN tunnel to a second network controller 421-2 is active. As shown at 478, the AP 412 may engage in a bid process with the second network Controller 421-2 of a second data center and may obtain a subnet from the second network controller 421-2. At 479, the AP 412 may terminate broadcasting of a SSID to the client device 415 for a predetermined period to cause the client device 415 to be disconnected from the primary VLAN tunnel, as shown at 481. As shown at 484, the AP 412 may broadcast the SSID to the client device 415 to associate the client device 415 to the SSID, as shown at 490. In this way, the AP 412 may connect the client device 415 to a secondary VLAN that terminates at the second network controller 421-2.

The VLAN hosted by the second network controller 421-2 is installed on the SSID of the client device that is stored by the AP 412 to provide VPN services to the client device 415, as shown at 487. At 492, the AP 412 may receive a DHCP request from the client device 415 and may provide a DHCP acknowledgement to the client device 415, as shown at 494. At 496, the AP 412 may receive an ARP request from the client device 415 and may provide an IP address belonging to the secondary VLAN tunnel in response to the ARP request, as shown at 498. In this manner, the client device 415, the AP 412, the first network controller 421-1 and the second network controller 421-2 communicate with one another so that the AP 412 can toggle or switch from a primary VLAN tunnel terminating at the first network controller 421-1 to a secondary VLAN tunnel terminating at the second network controller 421-2. Toggling between the VLAN tunnels in this manner allows the AP 412 and/or the network controllers 421-1 and 421-2 to provide VPN redundancy to the client device 415, thereby increasing productivity and providing ease of use for an employee using the client device 415, for example.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. An access point, comprising:
a processing resource; and
a memory resource storing machine-readable instructions to cause the processing resource to:
assign a first tunnel tag to a first dynamic host configuration protocol (DHCP) profile of a client device, the first tunnel tag identifying a primary virtual local area network (VLAN) tunnel to a first network controller of a first data center;
assign a second tunnel tag to a second DHCP profile of the client device, the second tunnel tag identifying a secondary VLAN tunnel to a second network controller of a second data center;
determine whether the primary VLAN tunnel to the first network controller is inactive based on a threshold number of detected access failures;
connect the client device to the secondary VLAN tunnel in response to determining that the primary VLAN tunnel is inactive;
receive, from the client device, an address resolution protocol (ARP) request; and
transmit, to the client device, an internet protocol (IP) address of the secondary VLAN tunnel in response to the ARP request.

2. The access point of claim 1, wherein the processing resource, when connecting the client device to the secondary VLAN tunnel, is further to:
broadcast a service set identifier (SSID) to the client device.

3. The access point of claim 1, wherein the processing resource, when connecting the client device to the secondary VLAN tunnel, is further to:
engage in a bid process with the second network controller of the second data center; and
obtain a subnet from the second network controller of the second data center.

4. The access point of claim 1, wherein the processing resource, when connecting the client device to the secondary VLAN tunnel, is further to:
receive a DHCP request from the client device; and
provide a DHCP acknowledgement to the client device.

5. The access point of claim 1, wherein the secondary VLAN tunnel provides access to a distributed VLAN.

6. The access point of claim 1, wherein the client device is wirelessly connected to the access point using a pre-shared key (PSK) based service set identifier (SSID).

7. An access point, comprising:
a processing resource; and
a memory resource storing machine-readable instructions to cause the processing resource to:
assign a first tunnel tag to a first dynamic host configuration protocol (DHCP) profile of a client device, the first tunnel tag identifying a primary virtual local area network (VLAN) tunnel to a first network controller of a first data center;
assign a second tunnel tag to a second DHCP profile of the client device, the second tunnel tag identifying a secondary VLAN tunnel to a second network controller of a second data center;
determine whether the primary VLAN tunnel to the first network controller is inactive;

terminate broadcasting a service set identifier (SSID) to the client device for a predetermined time period to cause the client device to be disconnected from the primary VLAN tunnel;

connect the client device to the secondary VLAN tunnel in response to the primary VLAN tunnel being inactive, receive, from the client device, an address resolution protocol (ARP) request and transmit, to the client device, an internet protocol (IP) address of the secondary VLAN tunnel in response to the ARP request.

8. The access point of claim 7, wherein the processing resource, when connecting the client device to the secondary VLAN tunnel, is further to:

broadcast the SSID to the client device.

9. The access point of claim 7, wherein the processing resource, when determining whether the primary VLAN tunnel is inactive, is further to:

determine whether the primary VLAN tunnel is inactive based on a number of detected access failures.

10. The access point of claim 7, wherein the processing resource, when connecting the client device to the secondary VLAN tunnel, is further to:

receive a DHCP request from the client device; and forward the DHCP request to the second network controller.

11. The access point of claim 10, wherein the processing resource, when connecting the client device to the secondary VLAN tunnel, is further to:

receive a DHCP acknowledgment from the second network controller; and provide the DHCP acknowledgement to the client device.

12. The access point of claim 7, wherein the secondary VLAN tunnel provides access to a centralized VLAN.

13. A system, comprising:

an access point;

a first network controller of a first data center, the first network controller being connected to the access point; and a second network controller of a second data center, the second network controller being connected to the access point, wherein the system is to:

assign a first tunnel tag to a first dynamic host configuration protocol (DHCP) profile of a client device, the first tunnel tag identifying a primary virtual local area network (VLAN) tunnel to the first network controller;

assign a second tunnel tag to a second DHCP profile of the client device, the second tunnel tag identifying a secondary VLAN tunnel to the second network controller;

determine whether the primary VLAN tunnel to the first network controller is inactive based on a number of detected access failures;

engage the access point in a bid process with the second network controller of the second data center;

connect the client device to the secondary VLAN tunnel in response to determining that the primary VLAN tunnel is inactive;

provide the access point with a subnet from the second network controller of the second data center;

receive, from the client device, an address resolution protocol (ARP) request; and provide, to the client device, an internet protocol (IP) address associated with the secondary VLAN tunnel in response to the ARP request.

14. The system of claim 13, wherein the system, when connecting the client device to the secondary VLAN tunnel, is further to:

broadcast a service set identifier (SSID) to the client device.

15. The system of claim 13, wherein Virtual Private Network (VPN) redundancy for the client device is provided by connecting the client device to one of the primary VLAN tunnel and the secondary VLAN tunnel.

16. The system of claim 13, wherein the client device is wirelessly connected to the access point using a pre-shared key (PSK) based service set identifier (SSID).

17. The system of claim 13, wherein the first DHCP profile and the second DHCP profile belong to a network layer.

* * * * *